(12) United States Patent
Van Haag

(10) Patent No.: US 8,083,657 B2
(45) Date of Patent: Dec. 27, 2011

(54) DEFLECTION COMPENSATING ROLL

(75) Inventor: Rolf Van Haag, Kerken (DE)

(73) Assignee: Voith Patent GmbH, Heidenheim (DE)

( * ) Notice: Subject to any disclaimer, the term of this patent is extended or adjusted under 35 U.S.C. 154(b) by 1318 days.

(21) Appl. No.: 11/572,168

(22) PCT Filed: Jul. 18, 2005

(86) PCT No.: PCT/EP2005/053434
§ 371 (c)(1),
(2), (4) Date: Jan. 16, 2007

(87) PCT Pub. No.: WO2006/008283
PCT Pub. Date: Jan. 26, 2006

(65) Prior Publication Data
US 2008/0207418 A1 Aug. 28, 2008

(30) Foreign Application Priority Data
Jul. 19, 2004 (DE) .................. 10 2004 034 830

(51) Int. Cl.
*B21B 27/02* (2006.01)
*B21K 1/02* (2006.01)

(52) U.S. Cl. ........... 492/7; 492/2; 492/8; 492/9; 492/10; 492/46; 29/895

(58) Field of Classification Search .................. 492/2, 4, 492/5, 6, 7, 8, 9, 10, 11, 16, 20, 46; 29/895
See application file for complete search history.

(56) References Cited

U.S. PATENT DOCUMENTS

| | | | | |
|---|---|---|---|---|
| 3,846,883 A | * | 11/1974 | Biondetti | 492/7 |
| 4,457,057 A | * | 7/1984 | Pav | 492/7 |
| 4,598,448 A | * | 7/1986 | Schiel et al. | 492/7 |
| 4,858,292 A | * | 8/1989 | Buhlmann et al. | 492/7 |
| 5,101,544 A | * | 4/1992 | Kubik | 492/7 |
| 5,286,245 A | * | 2/1994 | Schiel | 492/7 |
| 5,338,279 A | * | 8/1994 | Schiel | 492/7 |
| 5,534,117 A | * | 7/1996 | Roerig | 162/358.3 |
| 5,566,451 A | * | 10/1996 | Niskanen et al. | 29/895.3 |
| 5,645,517 A | * | 7/1997 | Stotz | 492/7 |
| 5,702,337 A | * | 12/1997 | Renn et al. | 492/7 |
| 5,853,359 A | * | 12/1998 | Grabscheid et al. | 492/7 |
| 5,919,121 A | * | 7/1999 | Kusters et al. | 492/7 |
| 6,471,018 B1 | | 10/2002 | Gordaninejad et al. | |

(Continued)

FOREIGN PATENT DOCUMENTS

DE 10136270 3/2003

(Continued)

*Primary Examiner* — Essama Omgba
(74) *Attorney, Agent, or Firm* — Greenblum & Bernstein, P.L.C.

(57) ABSTRACT

A deflection compensating roller including a rotating roller casing, a rotationally fixed yoke axially extending through the roller casing, at least one hydrostatic support device arranged between the yoke and the roller casing, the at least one hydrostatic support device comprising a pressure compartment and at least one oil pocket that communicates with the pressure compartment via at least one first restricted flow zone and at least one second restricted flow zone, and a fluid comprising at least one of an electrorheological fluid (ERF) and a ferro fluid. A viscosity of the fluid is adapted to be varied by way of one of an electric and magnetic field. This abstract is not intended to define the invention disclosed in the specification, nor intended to limit the scope of the invention in any way.

26 Claims, 1 Drawing Sheet

U.S. PATENT DOCUMENTS

| | | | |
|---|---|---|---|
| 6,659,926 B2* | 12/2003 | Haag | 492/7 |
| 7,037,249 B2* | 5/2006 | van Haag | 492/2 |
| 7,182,721 B2* | 2/2007 | van Haag | 492/6 |
| 7,258,654 B2* | 8/2007 | Bomba et al. | 492/7 |
| 7,465,264 B2* | 12/2008 | Bomba | 492/7 |
| 7,662,078 B2* | 2/2010 | Bomba et al. | 492/7 |
| 2003/0022774 A1* | 1/2003 | van Haag | 492/7 |
| 2005/0250632 A1* | 11/2005 | Haag | 492/7 |
| 2009/0018002 A1* | 1/2009 | Haag | 492/7 |

FOREIGN PATENT DOCUMENTS

EP 0364753 4/1990

\* cited by examiner

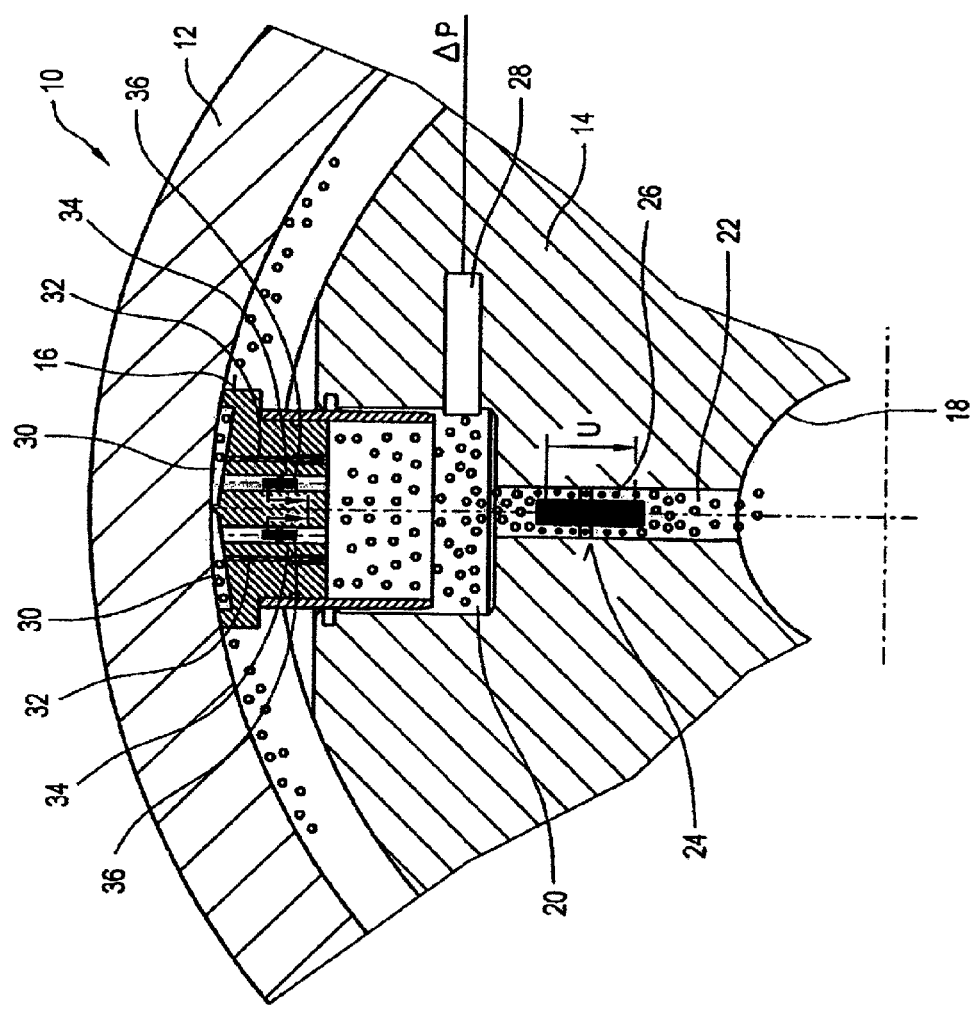

DEFLECTION COMPENSATING ROLL

CROSS-REFERENCE TO RELATED APPLICATIONS

The present application is a U.S. National Stage of International Patent Application No. PCT/EP2005/053434 filed Jul. 18, 2005 which published as WO 2006/008283 on Jan. 26, 2006, and claims priority of German Patent Application No. 10 2004 034 830.8 filed Jul. 19, 2004.

BACKGROUND OF THE INVENTION

1. Field of the Invention

This invention relates to a deflection compensating roller which comprises a rotating roller casing, a rotationally fixed yoke axially extending through the roller casing, and at least one hydrostatic support source arranged between the yoke and the roller casing, which on its end facing the roller casing is provided with at least one oil pocket that communicates with the pressure compartment of the support source via at least one first restricted flow zone.

2. Discussion of Background Information

In such deflection compensating rollers use is made of support sources which are pressurized by a supply line with oil pressure. This oil pressure presses the support source against the rotating roller casing. As the piston area of the support source is smaller than the pocket area facing the roller casing, a lower pocket oil pressure results. The pressure difference between the piston pressure and the pocket pressure defines the volume flow which flows via the capillaries that are connected between the pocket area and the piston area. Hence the volume flow which results at a support source depends on the piston pressure.

For individual profile correction of the product web running through the nip the support sources are pressurized with an oil pressure. The level of the oil pressures is controlled via online profile thickness measurement of the product web. However, depending on the profile corrections required this can result in large oil pressure differences at the support sources (e.g. 3.5 to 90 bar from support source to support source). This leads, as previously mentioned, to volume flow differences at the support sources. Friction arises between the rotating roller casing and the support sources due to the oil shear, which is dependent on the casing speed and the oil gap width, which in turn is dependent on the volume flow, the oil temperature and the pocket pressure.

Owing to the large pressure differences the result therefore is a level of friction energy which differs from one support source to another and results in temperature differences on the roller casing. These temperature differences have an effect in turn on the shape of the roller casing and hence a feedback effect on the formative distributed load profile of the deflection compensating roller.

Pressure relief at a support source results in the smaller volume flow, hence a higher temperature results at this support source in spite of a smaller friction energy in quantity terms than with high pressures. However, a higher temperature leads to an expansion of the roller casing, which results in a distributed load increase in the nip. The temperature development in question makes itself felt inverse to the desired pressure relief and is therefore undesirable. In some cases it can even lead to an instability of the control response.

Up to now it was generally customary to limit the temperature development at the support sources by a separate cooling current which is directed into the interior space of the roller. For this purpose a volume flow of low temperature was distributed in the inside space of the roller by means of nozzles, its quantity being controlled by way of the return run temperature of the roller. As the result of this distribution, each support source is fed with the same quantity of cooling oil. Owing to the previously described volume flow differences, different temperatures result at the support sources in spite of the supplied quantity of cooling oil. The mixed temperature resulting in the inside space of the roller corresponds roughly to the local return run temperature.

The resulting local return run temperatures display an increasing temperature difference between a high-loaded support source and a low-loaded support source as the cooling oil flows grow smaller. This temperature difference has a decisive effect on the shape of the rotating roller casing.

From DE 101 36 270 A there is already known a controlled deflection roller on which the quantity of fluid supplied locally to a respective roller zone by means of a temperature controlling device is variable as a function of the piston pressure of the support element in question or the support element group in question.

SUMMARY OF THE INVENTION

The present invention utilizes an improved deflection compensating roller of the type initially referred to, with which the previously mentioned problems are eliminated.

According to the invention a deflection compensating roller comprises a rotating roller casing, a rotationally fixed yoke axially extending through the roller casing, and at least one hydrostatic support source arranged between the yoke and the roller casing, which on its end facing the roller casing is provided with at least one oil pocket that communicates with the pressure compartment of the support source via at least one first restricted flow zone, whereby the support source is at least partially operated with an electrorheological fluid (ERF) and/or ferro fluid, the viscosity of which can be varied by way of an electric or magnetic field. The oil pocket communicates with the pressure compartment via at least one second restricted flow zone that is parallel to the first restricted flow zone and the additional volume flow flowing through the second restricted flow zone can be varied by means of a field that influences the viscosity of the electrorheological fluid (ERF) or ferro fluid.

As the result of this embodiment, the additional volume flow flowing through the second restricted flow zone can be accordingly varied for a desired temperature stabilization. Undesirable temperature influences can thus be suppressed or compensated. In this case use is made of the fact that the flow property or viscosity of an electrorheological fluid or ferro fluid changes under the influence of an electric or magnetic field, meaning that a volume flow for example can be varied by changing the field in question.

Under the influence of the field in question it is possible for the flow properties of the electrorheological fluids (ERF) or ferro fluids to be steplessly and reversibly changed. The electrorheological fluids (ERF) available today include in particular silicon oil, in which polyurethane particles are dispersed. As the electric voltage or field strength increases, so the apparent viscosity of the electrorheological fluids (ERF) in the field increases and the volume flow decreases. The properties of an electrorheological fluid (ERF) or ferro fluid thus enable a relatively easy, fast and always fail-proof volume flow control for example. Also conceivable, furthermore, is in particular a support source pressure control using a corresponding variation of the viscosity of the electrorheological fluid or ferro fluid. In addition it is possible to selectively implement certain damping properties at the support source or to selectively influence the guidance response of the roller casing.

Preferably the additional volume flow flowing through the second restricted flow zone can be varied by way of the field in question as a function of the pressure in the pressure compartment.

In this case the additional volume flow flowing through the second restricted flow zone can be controlled by way of the field in question in particular such that a smaller or no additional volume flow results at higher pressures in the pressure compartment and a larger additional volume flow results at lower pressures in the pressure compartment. In the event that no additional volume flow flows any longer at higher pressures, the support source in question is operated accordingly like a conventional support source. At low piston pressures, on the other hand, an additional volume flow flows via the support source, which is accompanied by a widening of the oil gap and hence by a reduction of the friction energy.

The lower friction and the increased volume flow result in a significant reduction of the oil temperature resulting in the return run, as the result of which the negative thermal effects mentioned at the beginning are avoided.

The inventive parallel circuit comprising one fixed restricted flow zone and one electrically or magnetically controllable restricted flow zone is also an advantage in that no mixed friction between the support sources and the rotating roller casing can arise in the event of any faulty pressurization of the controllable restricted flow zone. With fully closed, electrically or magnetically controllable restricted flow zones, the functionality of the support sources is maintained without change.

On an expedient, practical embodiment of the inventive deflection compensating roller on which the support source is at least partially operated with an electrorheological fluid (ERF), the additional volume flow flowing through the second restricted flow zone can be varied by way of an electric field. In this case an electric conductor, cable or the like can be arranged in the second restricted flow zone in order to generate the electric field.

Advantageously it is also possible in particular to vary the hydraulic pressure or pressure in the pressure compartment by way of a field influencing the viscosity of the electrorheological fluid (ERF) or ferro fluid. In this case provision can be made in particular for a pressure control.

In principle it is also possible in particular to vary the volume flow flowing through the first restricted flow zone by way of a field influencing the viscosity of the electrorheological fluid (ERF) or ferro fluid. In this case too provision can again be made in particular for a volume flow control.

Now conceivable are, for example, such embodiments of the deflection compensating roller on which the support source is operated solely with the electrorheological fluid or ferro fluid.

In this case several support sources can be fed with the electrorheological fluid (ERF) or ferro fluid via a common supply line in which the system pressure (e.g. pump pressure) is maintained.

Between the pressure compartment of a respective support source and the common supply line provision is made for preferably respectively one connecting line in which is integrated a restricted flow zone in which is arranged for example an electric conductor, cable or the like for generating the field.

While the viscosity of a respective electrorheological fluid (ERF) can be changed as a rule by way of an electric field or an electric voltage, it is possible with the likewise usable ferro fluids for the viscosity to be changed by activating a corresponding magnetic field.

The invention also provides for a deflection compensating roller comprising a rotating roller casing, a rotationally fixed yoke axially extending through the roller casing, at least one hydrostatic support device arranged between the yoke and the roller casing, the at least one hydrostatic support device comprising a pressure compartment and at least one oil pocket that communicates with the pressure compartment via at least one first restricted flow zone and at least one second restricted flow zone, and a fluid comprising at least one of an electrorheological fluid (ERF) and a ferro fluid, wherein a viscosity of the fluid is adapted to be varied by way of one of an electric and magnetic field.

The first and second restricted flow zones may be parallel to each other. A volume flow flowing through said second restricted flow zone may be adapted to be varied by way of one of an electric and magnetic field. A viscosity of the volume flow may be adapted to be varied by way of one of an electric and magnetic field. The volume flow may be adapted to be varied as a function of a pressure in the pressure compartment. The volume flow may be controlled. The volume flow may be different at higher pressures in the pressure compartment than at lower pressures in the pressure compartment. The volume flow may be less at higher pressures in the pressure compartment than at lower pressures in the pressure compartment. The hydrostatic support device may be at least partially operated with the electrorheological fluid (ERF) and an additional volume flow flowing through the second restricted flow zone is adapted to be varied via an electric field. The second restricted flow zone may comprise one of an electric conductor and a cable. The viscosity of the fluid may be adapted to be varied by way of a device that produces one of an electric and magnetic field. A pressure the pressure compartment may be adapted to be varied by way of a field influencing said viscosity. A hydraulic pressure may be adapted to be varied by way of a field influencing said viscosity. The roller may be adapted to utilize pressure control. A volume flow flowing through said first restricted flow zone may be adapted to be varied by way of an electric or magnetic field. The hydrostatic support device may utilize volume flow control. The hydrostatic support device may be operated solely with the fluid. The hydrostatic support device may comprise a plurality of hydrostatic support devices supplied with the fluid via a common supply line. A system pressure may be maintained via the common supply line. The roller may further comprise a restricted flow zone arranged between a supply line and the pressure compartment. The roller may further comprise a device for generating a field in the restricted flow zone. The device for generating a field may comprise one of an electric conductor and a cable.

The invention also provides for a deflection compensating roller comprising a rotating roller casing, a rotationally fixed yoke, at least one hydrostatic support device arranged between the yoke and the roller casing, the at least one hydrostatic support device comprising a pressure compartment and at least one oil pocket that communicates with the pressure compartment via first and second restricted flow zones, a fluid comprising at least one of an electrorheological fluid (ERF) and a ferro fluid, and a device for generating a field arranged one of in at least one of the first and second restricted flow zones and in a restricted flow zone arranged between a common supply line and the pressure compartment.

A viscosity of the fluid may be adapted to be varied by the device for generating a field.

The invention also provides for a deflection compensating roller comprising a rotating roller casing, at least one hydrostatic support device arranged between the yoke and the roller casing, the at least one hydrostatic support device comprising a pressure compartment and at least one oil pocket that communicates with the pressure compartment via first and second restricted flow zones, a fluid comprising at least one of an electrorheological fluid (ERF) and a ferro fluid, a device for generating an electric or magnetic field arranged in a restricted flow zone arranged between a common supply line and the pressure compartment and in at least one of the first and second restricted flow zones.

The invention also provides for a method of using a deflection compensation roller rotating roller utilizing a rotating roller casing arranged on a rotationally fixed yoke to correct a web profile, wherein the method comprises arranging at least one hydrostatic support device between the yoke and the roller casing, feeding a fluid comprising at least one of an electrorheological fluid (ERF) and a ferro fluid to a pressure compartment and at least one oil pocket communicating with the pressure compartment via first and second restricted flow zones, and generating an electric or magnetic field in a restricted flow zone arranged between a common supply line and the pressure compartment and in at least one of the first and second restricted flow zones.

BRIEF DESCRIPTION OF THE DRAWINGS

The invention will be described in more detail in the following text using an exemplary embodiment and with reference to the drawing.

DETAILED DESCRIPTION OF THE INVENTION

In the drawing, the single FIGURE shows a schematic partial representation in section of an exemplary embodiment of a deflection compensating roller 10, which comprises a rotating roller casing 12, a rotationally fixed yoke 14 axially extending through the roller casing 12, and at least one support source 16 arranged between the yoke 14 and the roller casing 12.

In the case in question, the support source 16 is operated solely with an electrorheological fluid (ERF) or ferro fluid, the viscosity of which can be varied by way of an electric or magnetic field.

In this case it is possible to vary, inter alia, the hydraulic pressure by way of the field influencing the viscosity of the electrorheological fluid (ERF) or ferro fluid, whereby provision can be made in particular for a pressure control. Several, preferably all support sources 16 are fed with the electrorheological fluid (ERF) or ferro fluid via a common supply line 18 in which the system pressure (e.g. pump pressure) is maintained.

A connecting line 22 is provided respectively between the pressure compartment 20 of a respective support source 16 and the common supply line 18. Integrated in this connecting line 22 is a restricted flow zone 24, in which is arranged an electric conductor 26, a coil or the like for generating the field.

Also, provision is made for a pressure sensor 28 which is connected directly to the pressure compartment 20 of the support source 16.

The electric controller provided for the pressure control is arranged preferably outside the roller 10.

Each support source 16 is preferably operated solely with the electrorheological fluid (ERF) or ferro fluid. Pressure is supplied via the common supply line 18 for all support sources or support elements 16 in which the system pressure (e.g. pump pressure) is maintained. Integrated in the connecting line 22 to the pressure compartment 20 of a respective support source 16 is the restricted flow zone 24, in which the field in question can be generated by way of the electric conductor 26, coil or the like. According to the invention, an electric field is generated or a voltage applied and, i.e. the viscosity of an electrorheological fluid (ERF) is accordingly influenced. As mentioned, it is also possible however to use a ferro fluid, for example, whose viscosity can then be influenced accordingly by way of a corresponding magnetic field.

To control the hydraulic pressure under the support source 16 the actual pressure is recorded with the pressure sensor 28, which can be formed by a commercially available pressure sensor. Hence, for the pressure control of a support source 16, all that is required inside the deflection compensating roller 10 is the restricted flow zone 24 with an insulated voltage connection, two cables and one pressure sensor 28, for example.

As is evident from the single FIGURE, the hydrostatic support source 16 has, on its side facing the roller casing 12, at least one oil pocket 30 which is connected to the pressure compartment 20 of the support source 16 via at least one first restricted flow zone 32. Two such oil pockets 30 are evident in the single FIGURE.

In this case, a respective oil pocket 30 communicates with the pressure compartment 20 via at least one second restricted flow zone 34 that is parallel to the first restricted flow zone 32. The additional volume flow flowing through the respective second restricted flow zone 34 can now be varied likewise by way of a field that influences the viscosity of the electrorheological fluid (ERF) or ferro fluid.

In this case the additional volume flow flowing through the second restricted flow zone 34 can be varied by way of the field in question, in particular, as a function of the pressure in the pressure compartment 20. In this case the additional volume flow flowing through the second restricted flow zone 34 can be controlled by way of the field in question, in particular, such that a smaller or no additional volume flow results at higher pressures in the pressure compartment 20 and a larger additional volume flow results at lower pressures in the pressure compartment 20.

According to the invention, an electric field U is generated or a voltage applied again and, i.e. the viscosity of an electrorheological fluid (ERF) is accordingly influenced here. Hence, in a respective second restricted flow zone 34, provision can again be made respectively for an electric conductor 36 or the like in order to generate the electric field. As previously mentioned, it is also possible however to use a ferro fluid for example, whose viscosity can then be influenced accordingly by way of a corresponding magnetic field. Integrated respectively in the second restricted flow zones 34 is then a coil or the like, by way of which the magnetic field is generated.

Hence, it is particularly easy for support sources, which are charged with a flow of electrorheological fluid or ferro fluid, to be rearranged or developed further in order to suppress undesirable temperature influences. Connected in parallel for each oil pocket, in addition to the customary capillary bores (first restricted flow zone), is at least one second restricted flow zone through which an additional flowing volume flow can be controlled by activating an electric or magnetic field preferably as a function of the piston pressure applied.

At high piston pressures, the parallel-connected second restricted flow zones are subjected to a voltage which is so high that no electrorheological fluid, or only a small quantity thereof, flows through the second restricted flow zones. In this case, the support source is operated like a conventional support source.

At low piston pressures a lower voltage is applied so that an additional volume flow flows via the support source. This leads to a widening of the oil gap and hence to a reduction of the friction energy.

The lower friction and the increased volume flow result in a significant reduction of the oil temperature resulting in the return run, as the result of which the negative thermal effects mentioned at the beginning are avoided.

The parallel circuit comprising one fixed restricted flow zone and one electrically or magnetically controllable restricted flow zone is an advantage in that no mixed friction between the support sources and the rotating roller casing arise in the event of any faulty pressurization of the controllable restricted flow zone. With fully closed, for example electrically or magnetically controllable second restricted flow zones, the functionality of the support sources is maintained without change.

List of Reference Numerals

10 Deflection compensating roller
12 Roller casing
14 Yoke
16 Support source
18 Supply line
20 Pressure compartment
22 Connecting line
24 Restricted flow zone
26 Electric conductor
28 Pressure sensor
30 Oil pocket
32 First restricted flow zone
34 Second restricted flow zone
36 Conductor.

The invention claimed is:

1. A deflection compensating roller comprising:
a rotating roller casing;
a rotationally fixed yoke axially extending through the roller casing;
at least one hydrostatic support device arranged between the yoke and the roller casing;
the at least one hydrostatic support device comprising at least one oil pocket that communicates with a pressure compartment via at least one first restricted flow zone and at least one second restricted flow zone;
a fluid comprising at least one of an electrorheological fluid (ERF) and a ferro fluid; and
a device generating one of an electric and magnetic field structured and arranged to vary a viscosity of said fluid in at least one of the first and second restricted flow zones.

2. The roller of claim 1, wherein said first and second restricted flow zones are parallel to each other.

3. The roller of claim 1, wherein a volume flow flowing through said second restricted flow zone is varied.

4. The roller of claim 3, wherein a viscosity of the volume flow is varied.

5. The roller of claim 3, wherein the volume flow is adapted to be varied as a function of a pressure in the pressure compartment.

6. The roller of claim 3, wherein the volume flow is controlled.

7. The roller of claim 6, wherein the volume flow is different at higher pressures in the pressure compartment than at lower pressures in the pressure compartment.

8. The roller of claim 6, wherein the volume flow is less at higher pressures in the pressure compartment than at lower pressures in the pressure compartment.

9. The roller of claim 1, wherein said hydrostatic support device is at least partially operated with the electrorheological fluid (ERF) and an additional volume flow flowing through the second restricted flow zone is adapted to be varied via an electric field.

10. The roller of claim 1, wherein said second restricted flow zone comprises the generating device and the generating device is one of an electric conductor and a cable.

11. The roller of claim 1, wherein a pressure of the pressure compartment is adapted to be varied by varying said viscosity.

12. The roller of claim 1, wherein a hydraulic pressure is adapted to be varied by varying said viscosity.

13. The roller of claim 1, wherein the roller is adapted to utilize pressure control.

14. The roller of claim 1, wherein a volume flow flowing through said first restricted flow zone is varied.

15. The roller of claim 1, wherein said hydrostatic support device utilizes volume flow control.

16. The roller of claim 1, wherein said hydrostatic support device is operated solely with the fluid.

17. The roller of claim 1, wherein said hydrostatic support device comprises a plurality of hydrostatic support devices supplied with the fluid via a common supply line.

18. The roller of claim 17, wherein a system pressure is maintained via the common supply line.

19. The roller of claim 1, further comprising a restricted flow zone arranged between a supply line and the pressure compartment.

20. The roller of claim 19, further comprising a device for generating a field in the restricted flow zone.

21. The roller of claim 20, wherein the device for generating a field in the restricted flow zone comprises one of an electric conductor and a cable.

22. The roller of claim 1, wherein one of the at least one first and second restricted flow zones utilizes an electrically controlled fluid flow between the pressure compartment and the at least one oil pocket.

23. The roller of claim 1, further comprising:
a pressure sensor sensing pressure in the pressure compartment;
a device for varying viscosity of the fluid in a third restricted flow zone that supplies the fluid to the pressure compartment; and
a control controlling the pressure in the pressure compartment.

24. The roller of claim 1, wherein the viscosity of the fluid is not varied in the first restricted flow zone and is varied in the second restricted flow zone.

25. A deflection compensating roller comprising:
a rotating roller casing;
a rotationally fixed yoke;
at least one hydrostatic support device arranged between the yoke and the roller casing;
the at least one hydrostatic support device comprising a pressure compartment and at least one oil pocket that communicates with the pressure compartment via first and second restricted flow zones;
a fluid comprising at least one of an electrorheological fluid (ERF) and a ferro fluid; and a device for generating a field arranged in at least one of:
- at least one of the first and second restricted flow zones; and
- a restricted flow zone arranged between a common supply line and the pressure compartment, wherein a viscosity of the fluid is varied by the device for generating a field in at least one of the first restricted flow zone, the second restricted flow zone, and the restricted flow zone arranged between the common supply line and the pressure compartment.

26. A method of using a deflection compensation roller rotating roller utilizing a rotating roller casing arranged on a rotationally fixed yoke to correct a web profile, the method comprising:

arranging at least one hydrostatic support device between the yoke and the roller casing;

feeding a fluid comprising at least one of an electrorheological fluid (ERF) and a ferro fluid to a pressure compartment and at least one oil pocket communicating with the pressure compartment via first and second restricted flow zones; and generating an electric or magnetic field in a restricted flow zone arranged between a common supply line and the pressure compartment and in at least one of the first and second restricted flow zones so as to vary a viscosity of the fluid in at least one of the first and second restricted flow zones.

* * * * *